United States Patent [19]

Aimono

[11] Patent Number: 5,164,205
[45] Date of Patent: Nov. 17, 1992

[54] APPARATUS FOR STAMPING MONOFILAMENT FOR SLIDER FASTENER COUPLING ELEMENTS

[75] Inventor: Sakae Aimono, Toyama, Japan
[73] Assignee: Yoshida Kogyo K.K., Tokyo, Japan
[21] Appl. No.: 666,046
[22] Filed: Mar. 7, 1991
[30] Foreign Application Priority Data Mar. 7, 1990 [JP] Japan .................................. 2-53539

[51] Int. Cl.⁵ .............................................. D01D 5/20
[52] U.S. Cl. ................................... 425/336; 264/167;
264/168; 264/281; 425/367
[58] Field of Search ................ 425/367, 336; 264/175,
264/167, 168, 281, 282

[56] References Cited

U.S. PATENT DOCUMENTS

| | | | |
|---|---|---|---|
| 969,460 | 9/1910 | Chartener | 425/336 |
| 1,287,275 | 12/1918 | Ford | 425/336 |
| 1,606,271 | 11/1926 | Stratford | 264/175 |
| 1,947,066 | 2/1934 | Sieg | 425/367 |
| 2,185,884 | 1/1940 | Bruker et al. | 425/367 |
| 2,917,779 | 12/1959 | Kurzke et al. | 264/167 |
| 3,387,349 | 6/1968 | Trifunovic et al. | 264/168 |

FOREIGN PATENT DOCUMENTS 63-8902 2/1988 Japan .

Primary Examiner—David A. Simmons
Assistant Examiner—William J. Matney, Jr.
Attorney, Agent, or Firm—Hill, Van Santen, Steadman & Simpson

[57] ABSTRACT

An apparatus for stamping a monofilament to form shaped portions for slide fastener coupling elements, including: a stationary shaft having a mandrel extending from its one end; a pair of stamping rollers comprising a cylindrical roller and an annular roller; and a monofilament supply roller for supplying a monofilament. The apparatus stamps a monofilament so as to provide coupling head portions, leg turnover portions, deformed portions, grooves, etc. of slide fastener coupling elements.

2 Claims, 4 Drawing Sheets

APPARATUS FOR STAMPING MONOFILAMENT FOR SLIDER FASTENER COUPLING ELEMENTS

BACKGROUND OF THE INVENTION

1. Field of the Invention

This invention relates to an apparatus for stamping a monofilament of synthetic resin for slide fastener coupling elements, and more particularly to a stamping apparatus for continuously providing on monofilament coupling head portions, leg turnover portions, deformed portions facilitating bending, grooves receptive of sewing threads, etc. of side fastener coupling elements.

2. Description of the Related Art

An apparatus for stamping a monofilament for a coiled slide fastener coupling element is known from, for example, Japanese Patent Publication 8902/1988. In the known apparatus, as shown in FIGS. 4 to 6, a monofilament G is continuously stamped by a pair of stamping rollers E, E as the monofilament G is supplied between the rollers E, E through a guide hole in a rotary member D rotatably disposed on a stationary shaft B and having a mandrel extending from one of its ends, so that a stamped monofilament C is wound around the rotary member D.

However, in this prior art apparatus, since the monofilament is supplied solely by the stamping rollers, the monofilament will not be uniformly carried depending upon its amount remaining on a bobbin, or vibrations applied to a monofilament feeding path, which will result in irregularly stamped positions on and along the monofilament. In addition, since the stamping teeth H bite into the monofilament abruptly, cracks tend to develop in shaped portions. And since the stamping teeth are separated from the monofilament suddenly after having compressed the monofilament, the pressing time is not sufficient to cure the individual shaped portion in a correct contour. Therefore it is difficult to always obtain the shaped portions with accuracy.

SUMMARY OF THE INVENTION

It is therefore an object of this invention to provide an apparatus for stamping a monofilament with precision at regular intervals in the longitudinal direction thereof and without causing any crack or deformation on the monofilament.

According to this invention, there is provided an apparatus for stamping a monofilament, comprising: a frame; a stationary shaft disposed on said frame and having a mandrel extending from one end thereof; an inner rotary cylindrical member rotatably supported around said stationary shaft, and adapted to bend and wind a monofilament; an annular roller rotatably supported around said inner rotary cylindrical member, said annular roller having an inner circumferential surface and an inner gear so as to stamp the monofilament; a cylindrical roller rotatably supported in said inner rotary cylindrical member, said cylindrical roller including an outer circumferential surface and a gear which mate with said inner circumferential surface and said inner gear of said annular roller so as to stamp the monofilament; and a monofilament supply roller including a supply pulley for supplying the monofilament to mating areas between said inner circumferential surface and said outer circumferential surface, and a gear adapted to be engaged with said inner gear of said annular roller.

In the apparatus, the cylindrical roller and the monofilament supply roller are synchronously rotated together and both of these rollers are rotated on their own axes respectively in accordance with the difference of rate of rotation between the inner cylindrical member and the annular roller, so that the monofilament be stamped and shaped into coiled coupling elements. In addition, the cylindrical roller and the monofilament supply roller are disposed inside the inner rotary cylindrical member at positions symmetrical to, i.e, diametrically opposite to each other.

The above and other advantages, features and additional objects of this invention will be manifest to those versed in the art upon making reference to the following detailed description and the accompanying drawings in which a preferred structural embodiment incorporating the principle of this invention is shown by way of illustrative example.

DETAILED DESCRIPTION

A embodiment of this invention will now be described with reference to the accompanying drawings.

Figure 1:
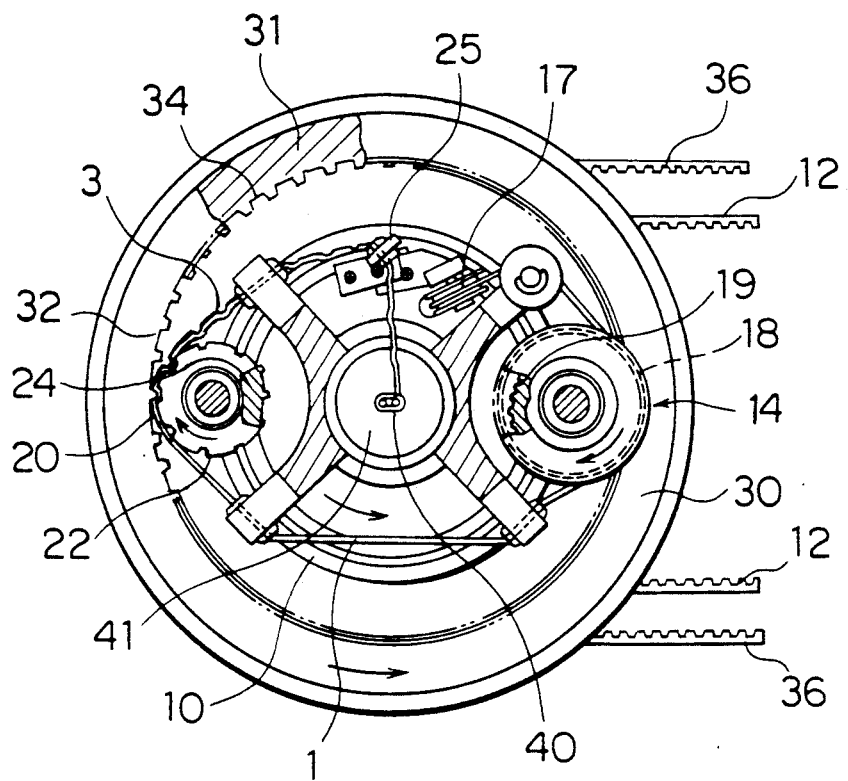
FIG. 1 is a plan view showing an apparatus according to an embodiment of this invention.
Figure 2:
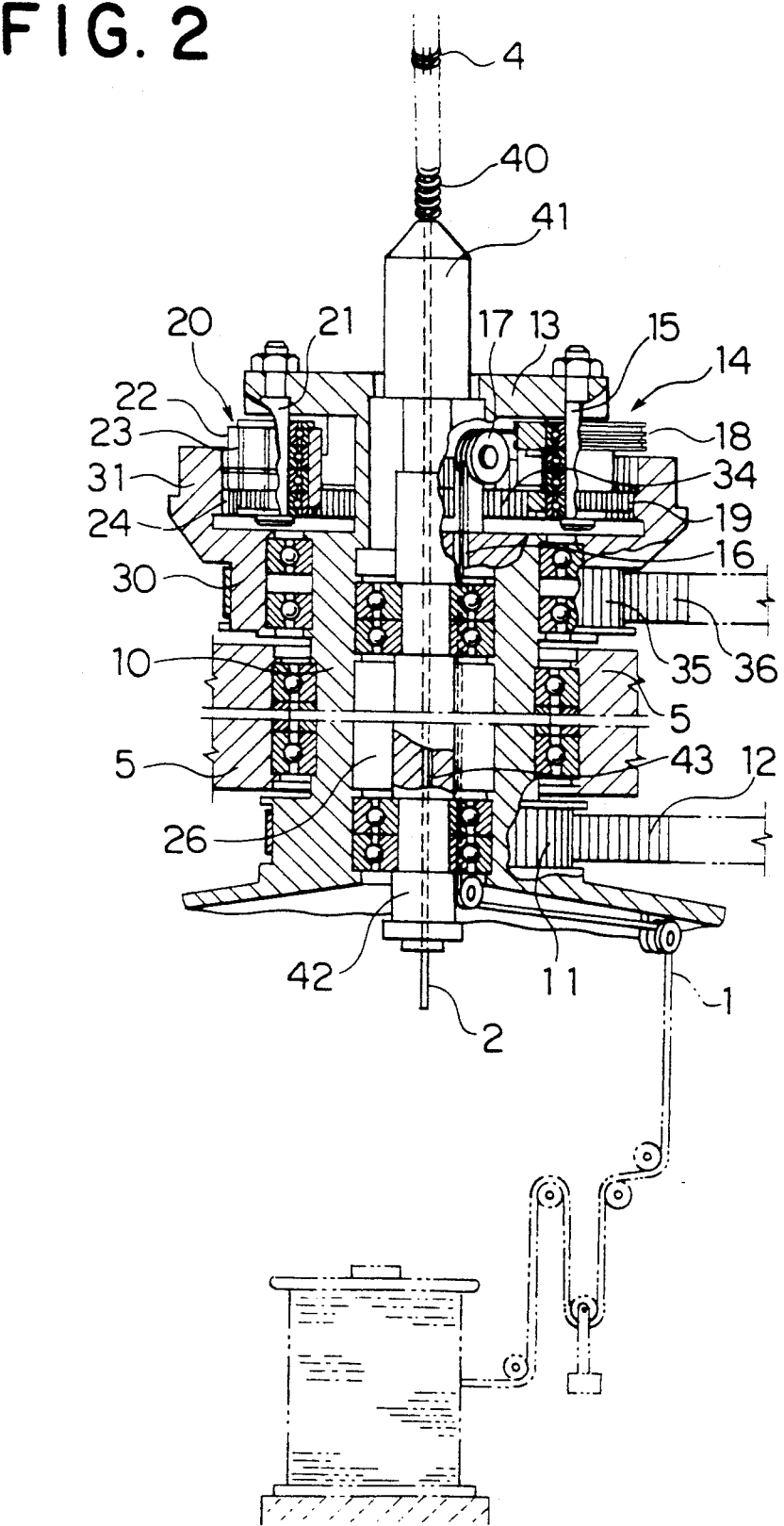
FIG. 2 is a cross-sectional view of the apparatus of FIG. 1.
Figure 4:
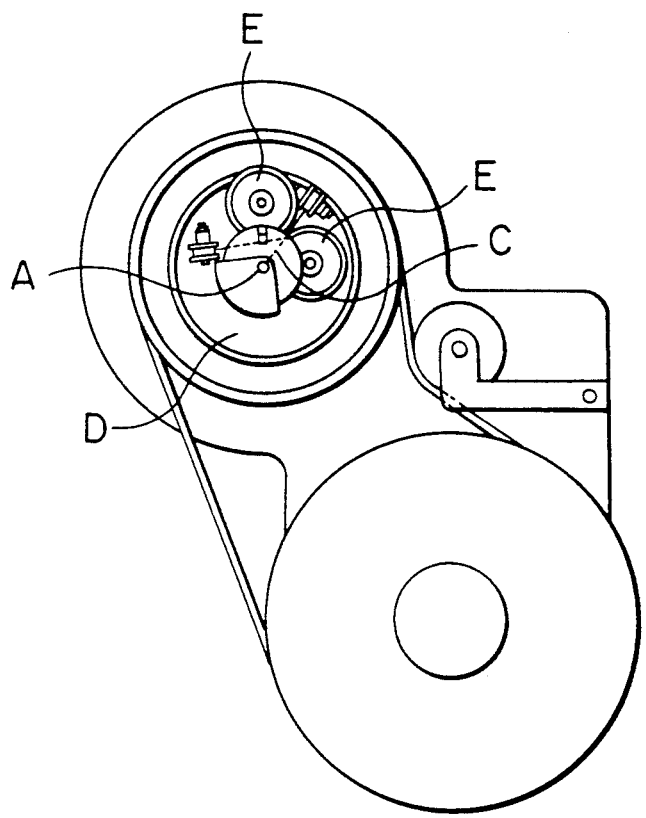
FIGS. 4 and 5 are a plan view and a cross-sectional view, respectively, of a prior art apparatus.
Figure 6:
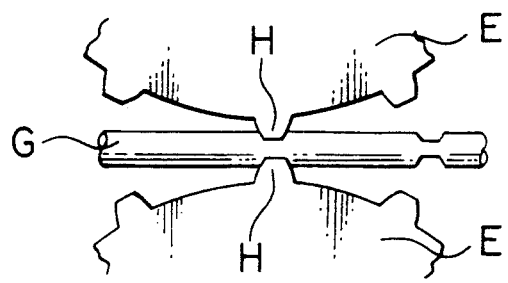
FIG. 6 is a fragmentary schematic view showing the manner in which a monofilament is stamped by the prior art apparatus.
Figure 5:
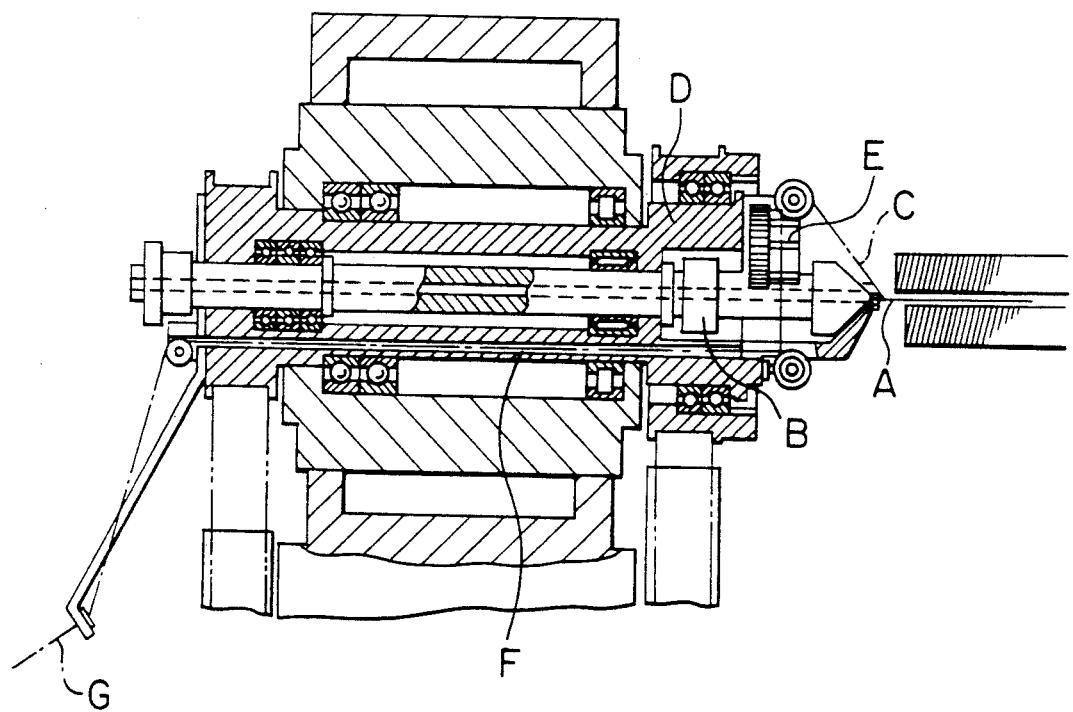

As shown FIGS. 1 and 2, an apparatus comprises a stamping device, which includes a roller for continuously and regularly supplying a monofilament of synthetic resin for a slide fastener coupling element, and a pair of stamping rollers for providing on the monofilament coupling head portions, leg turnover portions, deformed portions facilitating bending, grooves receptive of sewing threads, etc. of slide fastener coupling elements. The apparatus also comprises a coiled-coupling-element shaping device, which includes a mandrel, for shaping the stamped monofilament into coiled slide fastener coupling elements.

In the stamping device, a pair of stamping rollers comprise a cylindrical inner roller 20 disposed in an inner rotary cylindrical member 10 and an annular outer roller 31 disposed in an outer rotary cylindrical member 30, and are adapted to stamp the monofilament 1.

As shown in FIG. 2, at its central portion, the inner rotary cylindrical member 10 is rotatably supported on a frame 5 via a bearing. The inner rotary cylindrical member 10 is rotated by a first timing belt 12 which is trained over a first gear 11 at the lower end of the inner rotary cylindrical member 10 and is driven by driving means, not shown, such as a motor. On the top of the rotary cylindrical member 10, there is integrally disposed a support arm 13. A downwardly extending shaft 15 is disposed at a position symmetrical to, i.e., diametrically opposite to a downwardly extending shaft 21 on the support arm 13. A roller 14 for supplying the monofilament 1 is rotatably supported around the shaft 15, while the cylindrical inner roller 20 for stamping the monofilament is rotatably supported around the shaft 21

The supply roller 14 supplies a predetermined amount of the monofilament 1, which is upwardly guided toward the mating stamping rollers through a guide hole 16 formed in the rotary cylindrical member 10. The supply roller 14 includes at its upper part a supply pulley 18 for receiving several turns of the monofilament 1, and at the lower part thereof a gear 19, which is engaged with an inner gear 34 at the lower part of an inner circumferential surface 32 of the annular roller 31 in the rotary cylindrical member 30. The inner gear 34 and the gear 19 cause the supply pulley 18 to rotate.

As illustrated in FIG. 2, an outer circumferential surface 22 of the cylindrical inner roller 20 partially mates with the inner circumferential surface 32 of the annular outer roller 31 and stamps the monofilament 1. The cylindrical inner roller 20 has on and along its outer circumferential surface 22 a predetermined number of recesses 23 at predetermined distances. The cylindrical inner roller 20 has its lower part a gear 24, which rotates the cylindrical inner roller 20 when engaged with the inner gear 34 at the lower part of the inner circumferential surface 32 of the annular outer roller 31.

The rotary cylindrical member 30 is disposed outside the rotary cylindrical member 10 and is rotatably connected to the lower part of the inner rotary cylindrical member 10 via the bearing.

A second gear 35 is disposed on the outer lower surface of the rotary cylindrical member 30, and is adapted to be engaged with a second timing belt 36 driven by suitable driving means such as a motor, not shown, thereby rotating the outer rotary cylindrical member 30

The annular outer roller 31 is disposed on the rotary cylindrical member 30. The annular outer roller 31 has on and around its inner circumferential surface 32 a predetermined number of pressing projections 33 at predetermined distances. The pressing projections 33 cooperate with the corresponding recesses 23 to perform stamping. The inner gear 34 is disposed at the lower part of the annular outer roller 31 so as to be engageable with both of the gear 19 of the supply roller 14 and the gear 24 of the cylindrical inner roller 20.

The shapes of the pressing projections 33 and the corresponding recesses 23 are suitably determined according to the shapes to be formed on the monofilament. The coupling head portions may be provided by stamping the monofilament by the cylindrical inner roller 20 having pressing projections on its outer circumferential surface 22, and the outer annular roller 31 having a flat inner circumferential surface 31. Alternately, the outer annular roller 31 is provided with pressing projections on its inner circumferential surface 31, while the cylindrical inner roller 20 has a flat outer circumferential surface.

The coiled-coupling-element shaping apparatus will be described hereinafter. The mandrel 40 is mounted on the top of a mandrel holder 41 so that the shaped monofilament 3 is bent and wound around the mandrel 40 and thus shaped into coiled coupling elements. The mandrel holder 41 is mounted at one end of a stationary shaft 42 received via a bearing in a central hole 26 on the rotary cylindrical member 10. The inner rotary cylindrical member 10 rotates around the stationary shaft 42, so that the shaped monofilament 3 is advanced upwardly as bent and wound around the mandrel 40 and thus shaped into coiled coupling elements. The mandrel 40 has therein a passageway through which a core cord 2 is to be supplied via the guide hole 43 in the stationary shaft 42, so that the coiled coupling elements 4 come out with the core cord 2 sandwiched therein.

The monofilament 1 is stamped and shaped into a coiled coupling element as described hereinafter. Firstly, the monofilament 1 is unwound from an unnumbered bobbin is upwardly advanced from the lowermost end of the inner rotary cylindrical member 10 through the guide hole 16. The monofilament 1 is then wound around the supply pulley 18 in several turns via an upper guide pulley 17 attached to the inner rotary cylindrical member 10, and is guided to an area between the outer circumferential surface 22 of the cylindrical roller 20 and the inner circumferential surface 32 of the annular roller 31. The monofilament 1 is always supplied by a predetermined length by the supply pulley 18, which is rotated by the gear 19 engaged with the inner gear 34 of the annular roller 31, in synchronization with the movement of the cylindrical roller 20, so that the monofilament is stamped at the predetermined uniform intervals in its lengthwise direction.

However, the degree of pressing the monofilament 1 against the circumferential surface of the supply pulley 18 depends on the amount of winding of the bobbin. Specifically, the larger the amount of winding of the bobbin, the smaller the tension of pulling the monofilament 1 is obtained to lower the degree of pressing the monofilament 1 against the circumferential surface of the supply pulley 18. Reversely, the smaller the amount of winding of the bobbin, the larger the tension of pulling the monofilament 1 is obtained to increase the degree of pressing the monofilament 1 against the circumferential surface of the supply pulley 18. This variation of the degree of pressing the monofilament 1 against the circumferential surface of the supply pulley 18 would adversely change the amount of supplying the monofilament 1 from the supply pulley 18. To this end, as indicated by phantom lines in FIG. 2, a tension adjusting means such as dancing rollers may be located between the bobbin and the rotary cylindrical member 10 to prevent any change of the degree of tension of the monofilament 1 so that the monofilament 1 can be supplied to the supply pulley 18 at a constant tension.

The supply roller 14 includes at its upper part the supply pulley 18, and at its lower part the gear 19 for rotation thereof. The gear 19 is engaged with the inner gear 34 of the annular roller 31, and likewise a gear 24 (described below) for rotating the cylindrical roller 20 is engaged with the inner gear 34 of the annular roller 31. Since the annular roller 31 is disposed in the outer rotary cylindrical member 30 whose rate of rotations is slightly smaller than that of the inner rotary cylindrical member 10, the gear 19 is caused to rotate by the difference of rate of rotation between the inner and outer rotary cylindrical members 10 and 30, respectively. The supply roller 14 and the inner rotary cylindrical member 10 are rotated together while the supply roller 14 is rotated on its own axis, thereby supplying the monofilament 1. Instead of rotating the outer rotary cylindrical member 30 slightly slower than the inner rotary cylindrical member 10, the moving direction of the monofilament 1 may be changed, and the difference of rate of rotation may be caused by rotating the outer rotary cylindrical member 30 slightly faster than the inner rotary cylindrical member 10, so that the supply roller 14 may be rotated on its own axis. The same holds true to the rotation of the cylindrical roller 20 on its own axis (described later).

The monofilament 1 from the bobbin is wound several times around the supply pulley 18 at the upper part of the supply roller 14, so that the monofilament be supplied to the stamping rollers. When too much monofilament is fed from the bobbin, the monofilament wound around the supply pulley 18 is slackened and is caused to slide on the supply pulley 18 so as to reduce the tension and amount of the monofilament to be fed from the bobbin. Otherwise, when too little monofilament is fed from the bobbin, the monofilament is wound with tension around the supply pulley 18, thereby increasing the tension to pull the monofilament from the bobbin. Therefore, the amount of the monofilament to be fed can be automatically controlled, so that the predetermined amount of the monofilament can be continuously supplied to the stamping rollers by the supply pulley 18.

Figure 3:
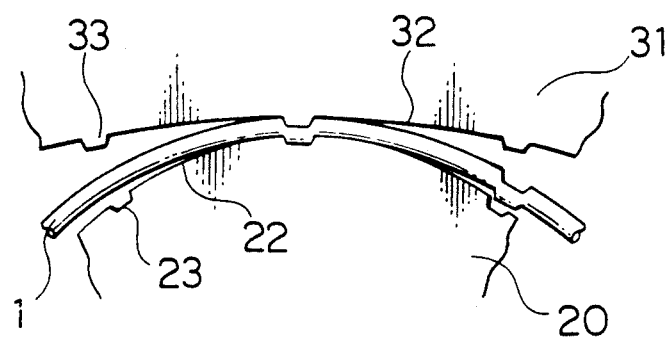
FIG. 3 is a fragmentary schematic view showing the manner in which a monofilament is stamped.

The cylindrical roller 20 serving as the stamping roller is provided with recesses 23 on its outer circumferential surface 22. As shown in FIG. 3, the cylindrical roller 20 comes into contact with the annular roller 31 so that the outer circumferential surface 22 of the cylindrical roller partially meets with the inner circumferential surface 32 of the annular roller 31, thereby stamping the monofilament 1 which is supplied by the predetermined length by the supply pulley 18. Similarly to the supply roller 14, the cylindrical roller 20 has at its lower part the gear 24, which engages with the inner gear 34 of the annular roller 31. The cylindrical roller 20, which is rotated by the outer rotary cylindrical member 30 rotating at a lower speed than that of the inner rotary cylindrical member 10, is rotated together with the inner rotary cylindrical member 10, and is also rotated on its own axis. As shown in FIG. 3, the monofilament 1 is continuously supplied to the mating areas between the stamping rollers, so that the monofilament 1 is stamped by the outer circumferential surface 22 of the cylindrical roller 20 and the inner circumferential surface 32 of the annular roller 31. Therefore various shaped portions of a prospective slide fastener coupling element are formed on the monofilament 1. Neither cracks nor deformations will develop on the stamped and shaped monofilament after it is separated from the stamping rollers.

While the inner rotary cylindrical member 10 makes one complete revolution, the supply roller 14 and the cylindrical roller 20 are rotated on their own axes. Meanwhile, the monofilament 1 is supplied, in a predetermined direction, by a length equal to the distance between an adjacent part of coupling head portions, namely, the length of a single coiled coupling element, during which time the monofilament 1 is stamped and is then wound around the mandrel 40 by a complete turn.

As shown in FIG. 1, the shaped monofilament 3 is changed its advancing direction by a direction-changing hanger guide 25. Then the monofilament 3 is advanced toward the mandrel 40, is wound around the mandrel 40 in coil shape, is shaped into a coiled coupling element 4 having the core cord 2 sandwiched therein, and is fed out from the end of the mandrel 40.

According to this invention, since the stamping apparatus includes the supply roller having the supply pulley which is rotated in synchronization with the stamping rollers, the predetermined length of the monofilament can be continuously supplied to the stamping rollers regardless of the amount of the monofilament on the bobbin or vibrations applied to the path for supplying the monofilament. Therefore, the monofilament ca be gradually stamped and formed with shaped portions such as coupling head portions, with accuracy.

In addition, since the inner circumferential surface of the annular roller and the outer circumferential surface of the cylindrical roller are brought firstly gradually near each other, the supplied monofilament can be gradually stamped without being abruptly pressed with the stamping rollers and without causing any cracks in the stamped and thus shaped portions. Then the shaped portions can be gradually separated from the shaping teeth, and therefore, the entire pressing time can be increased to minimize changes that the shaped portions would be adversely deformed.

Since the supply roller and the cylindrical roller are disposed inside the inner rotary cylindrical member at the positions symmetrical to, i.e., diametrically opposite to each other, the inner rotary cylindrical member is balanced so as to be rotated at a higher speed reliably and smoothly.

What is claimed is:

1. An apparatus for stamping a monofilament for slide fastener coupling elements, comprising:
   (a) a frame,
   (b) a stationary shaft disposed on said frame and having a mandrel extending from one end thereof;
   (c) an inner rotary cylindrical member rotatably supported around said stationary shaft, and adapted to bend and wind a monofilament;
   (d) an annular roller rotatably supported around said inner rotary cylindrical member, said annular roller having an inner circumferential surface and an inner gear so as to stamp the monofilament;
   (e) a cylindrical roller rotatably supported in said inner rotary cylindrical member, said cylindrical roller including an outer circumferential surface and a gear which mate with said inner circumferential surface and said inner gear of said annular roller so as to stamp the monofilament; and
   (f) a monofilament supply roller including a supply pulley for supplying the monofilament to mating areas between said inner circumferential surface and said outer circumferential surface, and a gear adapted to be engaged with said inner gear of said annular roller;
   wherein said cylindrical roller and said monofilament supply roller are adapted to be synchronously rotated together and both of said rollers are adapted to be rotated on their own axes respectively in accordance with the difference of rate of rotation between said inner cylindrical member and said annular roller.

2. An apparatus according to claim 1, wherein said cylindrical roller and said monofilament supply roller are disposed inside said inner rotary cylindrical member at positions diametrically opposite to each other.

* * * * *